No. 11,737. Reissued Apr. 25, 1899.
J. T. WAINWRIGHT.
MACHINE FOR EXHAUSTING MOLTEN METAL AT HIGH TEMPERATURE.
(Application filed Nov. 14, 1898.)
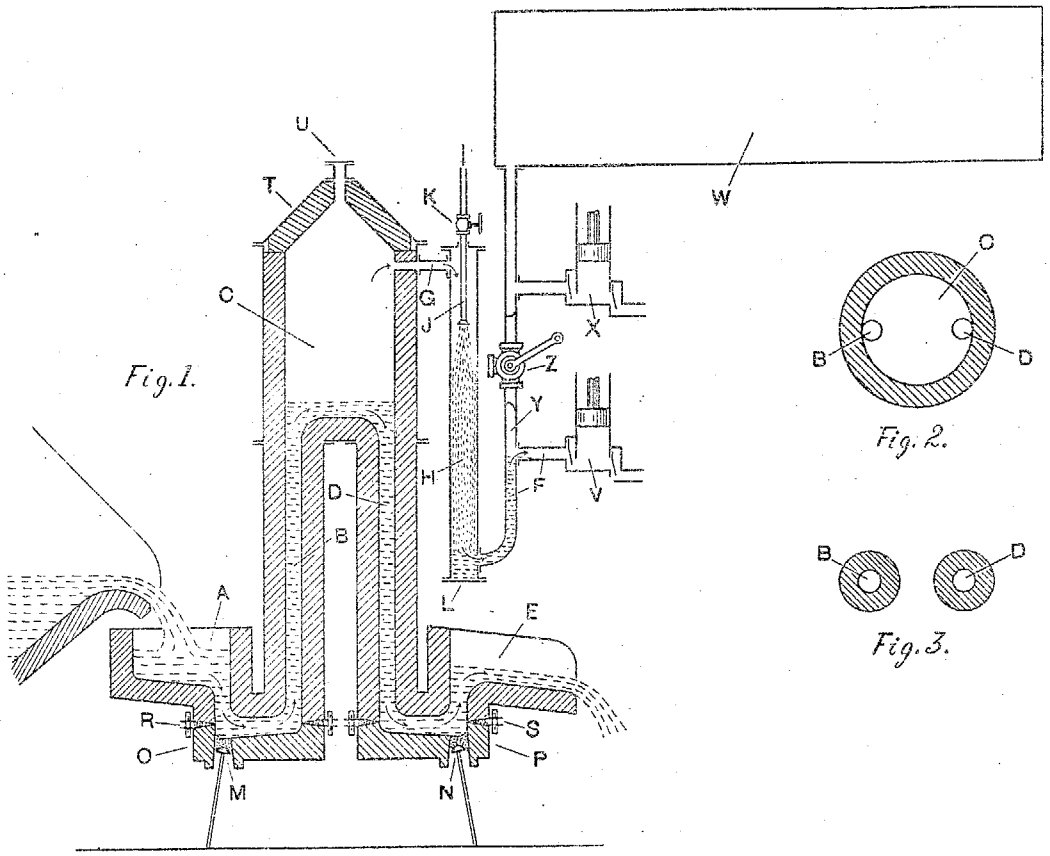
Witnesses
Arthur J. T. Bennett.
Paul Hillis
Jacob T. Wainwright, Inventor.

UNITED STATES PATENT OFFICE.

JACOB T. WAINWRIGHT, OF CHICAGO, ILLINOIS.

MACHINE FOR EXHAUSTING MOLTEN METAL AT HIGH TEMPERATURE.

SPECIFICATION forming part of Reissued Letters Patent No. 11,737, dated April 25, 1899.

Original No. 598,037, dated January 25, 1898. Reissue No. 11,671, dated June 21, 1898. Application for present reissue filed November 14, 1898. Serial No. 696,471.

*To all whom it may concern:*

Be it known that I, JACOB T. WAINWRIGHT, a citizen of the United States, residing at Chicago, in the county of Cook and State of Illinois, have invented new and useful Improvements in Machines for Exhausting Molten Metal at High Temperature, such as Molten Iron and the Like, of which the following is a specification.

The objects of my invention, as hereinafter claimed, are—

First. The production of an improvement wherewith an unlimited quantity of gas is extracted with a thorough exhaustion of a self-regulating inflow and outflow of molten metal. I accomplish this by means of the combination of elements set forth hereinafter in claim 1.

Second. The production of an improvement wherewith an unlimited quantity of gas is extracted with a thorough exhaustion of a self-regulating inflow of molten metal. I accomplish this by means of the combination of elements set forth hereinafter in claim 2.

Third. The production of an improvement wherewith a thorough exhaustion of an inflow of molten metal is effected without churning or violently agitating same; also, I accomplish this by means of the combination of elements set forth hereinafter in claim 2.

Fourth. The production of an improvement wherewith an unlimited quantity of gas is extracted with a prolonged thorough exhaustion of molten metal having a self-regulating outflow. I accomplish this by means of the combination of elements set forth hereinafter in claim 3.

As explanatory of what precedes, "self-regulating flow" herein means that the peculiar features of the apparatus effect a balancing or self-regulating action in the fluid metal, whereby sufficient molten metal is withheld in the unobstructed conduit to maintain a vacuum under all conditions as regards speed of supplying the molten metal to the apparatus, as an improvement and different from the application of an obstructing device like a plug, because a plug is not self-acting, is unreliable and troublesome, is more expensive to operate, and it is a matter of fact that a plug is impractical for such a purpose when applied to the treatment of metal at high temperature, such as molten iron. Such high temperature causes the plug to partially fuse with and stick fast to the interior lining, and thereby cause the apparatus to become inoperative.

An object of the above explanation is to show why a conduit obstructed by a plug cannot be considered as the equivalent of a trap-conduit and cannot contribute to any of the above-mentioned novel functions.

The accompanying drawings are merely conventional and show a preferred device in which are embodied all of the above-mentioned improvements.

Figure 1 shows a central vertical longitudinal section, the inlets and outlets and their seals, and the remaining parts connected thereto by the pipe G. Fig. 2 shows a sectional plan of the vacuum-chamber above its bottom. Fig. 3 shows a sectional plan of the inlet and outlet conduits to the vacuum-chamber below its bottom.

In the device shown an elevated vacuum or gas chamber is shown at C. To said chamber C is attached a device for exhausting the air and gases, as here shown an air or gas exhaust pump V, by means of pipes F H G and a pipe Y, forming a continuation thereof, with a three-way cock Z, arranged for either a straight open passage or to let in air either above or below it. Above said cock is a secondary chamber W and exhaust-pump X, connected to said pipe Y. Said pipe H is of enlarged diameter and provided with a jet J, controlled by a cock K, through which water flows to condense the gases drawn from the chamber C. It also has a removable cleansing-bottom L. Although not essential, it is convenient to have a water-gage and a vacuum-gage in connection with this condenser, connected in a manner as is usual on condensers of this type when applied to the operation of steam-engines. The exhausted chamber W may be closed by the cock Z and at a subsequent start furnish immediate exhaustion to the chamber C, which may thereafter be upheld by either one or both of said pumps. To said chamber C is also attached an inlet-conduit B, with an inverted lower end provided with a receiving-cup A and a luted outlet-plug M at its lower point, and an outlet-conduit D, with an inverted lower end with spout and a luted plug N at its lower point. When charged with liquid metal, said inverted ends constitute traps to form seals to the chamber C. Said removable plugs or stopped openings are for the purpose of removing the liquid seals.

The parts or bottoms O P are separable from the upper part at the luted joints R S.

The roof T is removable and provided with an opening U, covered with mica, through which the chamber may be inspected. When the apparatus is empty, it is desirable to maintain an elevated temperature in the interior by means of an ignited blast of gas and air introduced through this opening U.

The inside of the apparatus is made in part or in whole of suitable acid, neutral, or basic material, and the various parts are incased, connected, luted, and cooled all in accord with known practice in the construction and operation of metallurgical furnaces and receptacles.

The height at which the bottom of the chamber C can be above the top of the seals will depend on the specific gravity of the metal and the degree of exhaustion obtained in said chamber. The difference of level in the cups A E directs the flow, as indicated.

To operate said device, the cups A E are continuously filled with sufficient molten metal to fill their respective conduit, the chamber C is exhausted in either or both of said ways, and metal poured into the receiving-cup A, from which it flows through the inlet B and over the elevated bottom of the vacuum-chamber C and is thereby thoroughly exhausted and deprived of impurities thus eliminated, thence through the outlet D into the cup E, from which it may be cast or collected.

It will be observed that this apparatus does not churn or violently agitate the molten metal. Thereby a better product is produced as compared with the product from a device by which the molten metal is violently broken up and churned; also, that a prolonged exhaustion of the metal is effected by merely slowing the pour into the apparatus, and that this constitutes a novel method of operating a metal-exhausting machine, and consequently indicates invention.

When it becomes necessary to discontinue the operation, the seals are removed by removing the luted plugs M N. Thus means which differ from previous practice are provided for treating intermittent supplies of molten metal.

What I claim is—

1. In combination with an exhauster; a connected vacuum-chamber with an elevated bottom, a trap-inlet, and a trap-outlet; substantially.

2. In combination with an exhauster, a connected vacuum-chamber with an elevated bottom and a trap-inlet, substantially.

3. In combination with an exhauster, a connected vacuum-chamber with an elevated bottom and a trap-outlet, substantially.

JACOB T. WAINWRIGHT.

Witnesses:

PAUL WILLIS,

ARTHUR J. T. BENNETT.